United States Patent [19]

Stover

[11] 3,831,094

[45] Aug. 20, 1974

[54] MEANS TO PREVENT COINCIDENTAL PHASE MODULATION IN AN AMPLITUDE MODULATION TRANSMITTER

[75] Inventor: Harris A. Stover, Vienna, Va.

[73] Assignee: Collins Radio Company, Dallas, Tex.

[22] Filed: Aug. 30, 1973

[21] Appl. No.: 392,903

[52] U.S. Cl. .................. 325/159, 325/182, 325/184, 325/187, 332/37 D

[51] Int. Cl. .................. H04b 1/04

[58] Field of Search ........... 325/159, 184, 187, 182, 325/17, 62–64; 332/37 D; 331/15, 40, 182, 183

[56] References Cited

UNITED STATES PATENTS 3,509,462 4/1970 Ertman .................. 325/17

*Primary Examiner*—Albert J. Mayer
*Attorney, Agent, or Firm*—Richard W. Anderson; Robert J. Crawford

[57] ABSTRACT

Means, including a voltage controlled oscillator in a phaselocked loop, whereby the transmitted carrier frequency is locked to a source of carrier frequency generation. The loop loop includes AM modulator AM modulator such that coincidental phase modulation is removed from AM transmitted AM modulated carrier.

4 Claims, 2 Drawing Figures

Figure 1:
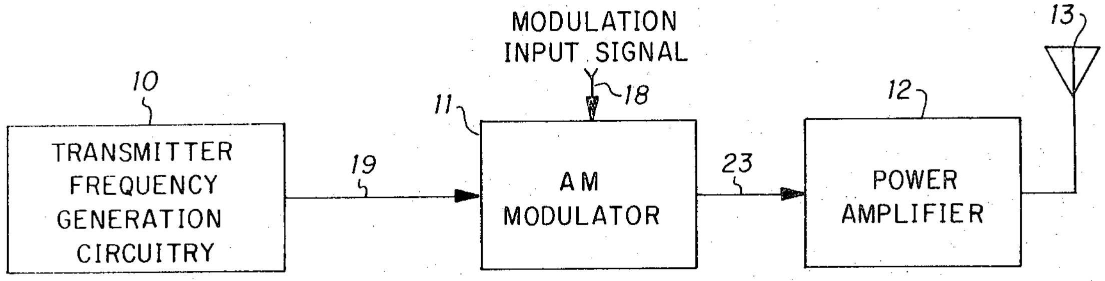
PRIOR ART FIG. 1

MEANS TO PREVENT COINCIDENTAL PHASE MODULATION IN AN AMPLITUDE MODULATION TRANSMITTER

THE INVENTION

This invention relates generally to amplitude modulation transmitters and more particularly to an improvement in such transmitters whereby coincidental phase modulation is prevented.

In an amplitude modulation transmitter where a source of carrier frequency is amplitude modulated in accordance with some intelligence signal, amplitude modulation alone exists as long as the resulting two sideband frequency components have equal amplitude and maintain the phase relationship with respect to the carrier component as defined in the following conventional expression:

$e(t) = E(1 + m \cos \omega_m t) \sin (\omega_c t + \phi) = E \sin (\omega_c t + \phi) = mE/2 \sin [(\omega_c + \omega_m) t + \phi] + mE/2 \sin [(\omega_c - \omega_m)t + \phi]$ The phase angle between the upper sideband and the carrier component is seen to be always equal in sign and equal in magnitude to the phase angle between the lower sideband and the carrier. If the above-defined amplitude or phase relationships are altered by any networks through which the signals pass, phase modulation of the carrier will result; that is, interaction between the various modulation frequencies in the AM spectrum will result from non-linearity in the AM modulator. Even though an AM modulator is, by definition, a nonlinear device, the modulated parameter of the carrier component may not vary as a linear function of the modulating signal, and thus coincidental phase modulation of the carrier may be encountered.

Many AM transmitters therefore produce a level of coincidental phase modulation of the transmitted signal and in many applications this phase modulation, though undesired, is tolerable since it causes no particular problem. In other situations coincidental phase modulation of AM transmitters can be a cause of serious degradation of some facet of the equipments normal function. This would be the case, for example, in a system wherein the transmitter is used for dual service and might employ a desired compatible phase modulation of the carrier frequency to convey one channel of intelligence in addition to the normal amplitude modulation intelligence function. Such is the case in a system described in my U.S. Pat. No. 3,714,375 entitled "Secondary Phase Modulation Communications Service via Area Broadcast Station" wherein is described a radio transmitter which fulfills its normal broadcast function using amplitude modulation and in addition employs low frequency, low deviation phase modulation for a secondary paging function. The low frequency and low phase deviation of the phase modulation introduces no detectable effect upon the normal amplitude modulation program function. As described in U.S. Pat. No. 3,714,375, even if every phase shift employed in the paging function is in the same direction, the low frequency of the shifts and their low deviation would cause a total frequency shift of only a few Hz. However, the very characteristics which prevent the phase modulation of this referenced system from having any effect upon the normal AM broadcast function cause the paging system to be susceptible to certain coincidental phase modulation resulting from the normal amplitude modulation of the transmitter, unless the transmitter modulator is extremely well designed for this characteristic or some form of corrective means is applied to prevent the undesired coincidental phase modulation.

Accordingly, the object of the present invention to provide a simple corrective means to prevent an AM modulated signal from having coincidental phase modulation which may stem from the AM modulation process.

The present invention is featured in the provision of employing a voltage control oscillator to generate the carrier frequency source which is amplitude modulated in the system, and to maintain a phase locked condition of the carrier frequency component of this AM modulated signal with a further source of transmitter frequency carrier signal. This further source might comprise the normal transmitter carrier frequency generation circuitry.

The invention is further featured in means employing a phaselocked loop and a voltage controlled oscillator whereby desired phase modulation of the carrier component may be applied to the source of carrier frequency generation and uneffected by the correction means by means of which coincidental phase modulation is prevented.

Figure 2:
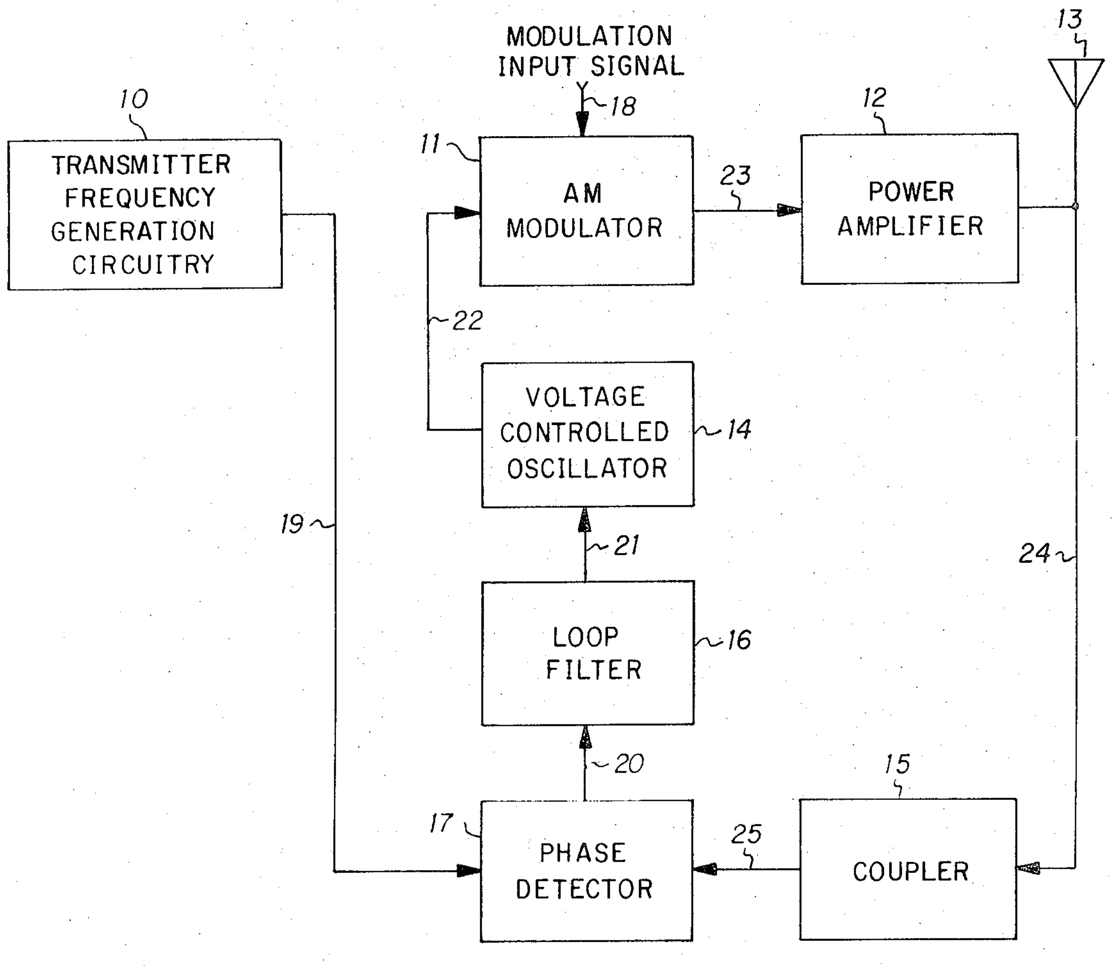

These and other features and object of the present invention will become apparent upon reading the following description with reference to the accompanying drawings in which:

FIG. 1 is a diagramatic representation of a conventional amplitude modulated transmitter; and FIG. 2 is a functional block diagram of an amplitude modulated transmitter system employing the coincidental phase modulation correction means in accordance with the present invention.

With reference to FIG. 1 the conventional amplitude modulation transmitter is depicted wherein the transmitter carrier signal is generated by a transmitter frequency generation circuitry 10. The output 19 from the carrier frequency generation circuitry is applied as a first intput to an AM modulator 11 to which a modulating input signal 18 is applied. The amplitude modulated carrier signal output 23 from the modulator 11 is applied to a power amplifier 12 and thence to the antenna 13 for radiation into space. It might be emphasized that the AM modulation system conventional depicted in FIG. 1 illustrates the modulation function occurring prior to power amplification, it being realized that the simple illustration of FIG. 1 may not fully indicate the application of high level modulation of the power amplifier as is utilized in some systems. However, the means of correction to be described herein is equally applicable for all methods of providing an amplitude modulation signal for transmission.

FIG. 2 illustrates the coincidental phase modulation correction system in accordance with the present invention as applied to the basic AM modulation transmitter of FIG. 1. In FIG. 2 it is noted that the output 19 from the transmitter frequency generation circuitry 10 is, in essence, disconnected from the AM modulator 11 and that the AM modulator 11 receives as a carrier frequency input signal the output 22 from a voltage controlled oscillator 14.

A phase-locked loop is depicted wherein a small amount of the signal applied to the transmitting antenna 13 is coupled through line 24 and coupling means 15 as a first input 25 to a phase detector 17. The other input to phase detector 17 comprises the output 19 from the transmitter frequency generation circuitry 10. The output 20 from phase detector 17 is applied to a loop filter 16, the output 21 of which is applied as a control input signal to voltage controlled oscillator 14.

In operation, a small amount of power amplifier output signal is applied as input 25 to phase detector 17 by means of coupler 15. Phase detector 17 compares the phase of the output of the transmitter power amplifier 12 with the output of the transmitter frequency generator 10. If the two inputs to phase detector 17 are not precisely 90° out of phase, an output 20 is provided from phase detector 17 which is filtered in loop filter 16 and applied as input 21 to voltage control oscillator 14. The output 20 from phase detector 17 comprises an error signal which controls the phase of voltage controlled oscillator 14 in such a way as to reduce the error signal from phase detector 17 to zero, locking the phase of the output of power amplifier 12 to the phase of the output of transmitter frequency generator 10.

Loop filter 16 may be selected to provide loop gain and loop bandwidth that will allow the phase-locked loop, constituted by all blocks except frequency generator 10, to correct for any coincidental phase modulation caused by amplitude modulator 11 for any modulation signal within its input bandwidth. The phase-locked loop of this system thus compensates for any coincidental phase modulation caused by amplitude modulation modulator 11 by shifting the phase of the output 22 from voltage controlled oscillator 14 in the opposite direction.

Any desired phase modulation of the carrier component of this system such as is employed in the above referenced radio paging system patent, may be applied in the frequency generation circuitry 10 and thus not effected by the phase correction system herein described.

The present invention thus provides a means for preventing coincidental phase modulation in an amplitude modulation transmitter in a manner which does not preclude desired phase modulation of the carrier frequency of the system as might be employed in a dual function system. Although the present invention has been described with respect to a particular embodiment thereof, it is not to be so limited, as changes might be made therein which fall within the scope of the invention as defined in the appended claims.

Wherein I claim:

1. An amplitude modulation transmitter comprising transmitter frequency generator means providing an output signal the frequency of which defines that of a carrier signal to be transmitted, amplitude modulation means, a voltage controlled oscillator, a modulating input signal, said amplitude modulation means receiving said modulating input signal and the output of said voltage controlled oscillator as respective inputs thereto and developing an amplitude modulated carrier output signal, and means for controlling the phase of the output from said voltage controlled oscillator in accordance with the relative phase between said amplitude modulated carrier output signal and the output signal from said transmitter frequency generator means.

2. An amplitude modulation transmitter as defined in claim 1 wherein said means for controlling comprises a phase-locked loop.

3. An amplitude modulation transmitter as defined in claim 2 wherein said phase-locked loop comprises a phase detector to which the output of said transmitter frequency generator means and said amplitude modulated output signal are applied as respective first and second inputs, and loop filtering means receiving the output of said phase detector and providing an output control signal for application to said voltage controlled oscillator, whereby said amplitude modulated output signal carrier component is locked in phase quadrature with the output signal from said transmitter frequency generating means.

4. An amplitude modulation transmitter as defined in claim 3 comprising signal coupling means receiving said amplitude modulated output signal and providing a predetermined low level sample of said output signal as said second input to said phase detector.

* * * * *

UNITED STATES PATENT OFFICE
CERTIFICATE OF CORRECTION

Patent No. 3,831,094 Dated August 20, 1974

Inventor(s) Harris A. Stover

It is certified that error appears in the above-identified patent and that said Letters Patent are hereby corrected as shown below:

IN THE ABSTRACT:

Line 4, delete "loop" (second occurrence);

after "includes", insert --the--.

The Abstract, line 5, cancel "modulator AM".

Line 6, delete "AM" (first occurrence) and substitute therefor --the--.

IN THE SPECIFICATION:

Column 1, line 20, change the equals (=) sign to a plus (+)

sign.

Signed and sealed this 28th day of January 1975.

(SEAL)
Attest:

McCOY M. GIBSON JR.
Attesting Officer

C. MARSHALL DANN
Commissioner of Patents